United States Patent [19]
Dunn, Jr.

[11] 3,713,781
[45] Jan. 30, 1973

[54] CROSS-FLOW FLUID BED REACTOR

[76] Inventor: Wendell E. Dunn, Jr., 12 Trelawney Street, Sydney, N.S.W., Australia

[22] Filed: Oct. 21, 1970

[21] Appl. No.: 82,337

[52] U.S. Cl. ..................23/284, 23/202 R, 75/26, 75/33, 266/24
[51] Int. Cl. .........B01j 1/00, C01g 23/04, C22b 1/10
[58] Field of Search ......23/284, 284.3, 288 S, 202 R; 34/57 A, 57 C; 75/26; 266/24

[56] References Cited

UNITED STATES PATENTS

| | | | |
|---|---|---|---|
| 2,501,487 | 3/1950 | Whitman | 34/57 C |
| 2,586,818 | 2/1952 | Harms | 23/284 UX |
| 2,641,849 | 6/1953 | Lintz | 34/57 C |
| 2,782,019 | 2/1957 | Turney et al. | 23/284 X |
| 3,042,498 | 7/1962 | Norman | 23/284 X |
| 3,539,293 | 11/1970 | Boucraut et al. | 23/284 X |
| 3,582,288 | 6/1971 | Taylor et al. | 23/284 |
| 1,528,319 | 3/1925 | Carteret et al. | 23/202 R |
| 1,542,350 | 6/1925 | Whittemore | 23/202 R X |
| 1,789,813 | 1/1931 | Gaus | 23/202 R UX |
| 2,184,884 | 12/1939 | Muskat et al. | 23/202 R X |
| 2,184,885 | 12/1939 | Muskat et al. | 23/202 R X |
| 2,371,619 | 3/1945 | Hartley | 75/26 UX |
| 2,557,528 | 6/1951 | Andrews | 23/202 R X |
| 3,120,999 | 2/1964 | Rummeny et al. | 23/202 R |
| 3,300,295 | 1/1967 | Boucraut et al. | 75/26 X |
| 3,433,624 | 3/1969 | Boucraut et al. | 75/26 X |

Primary Examiner—Barry S. Richman
Attorney—Samuel V. Abramo

[57] ABSTRACT

Apparatus for beneficiating titaniferous ores to produce essentially pure titanium dioxide by alternatingly contacting the ore at a temperature of 700° to 1250°C with carbon monoxide for a short period of time and then chlorine for a short period of time and then repeating the alternate steps of contacting the ore with carbon monoxide and chlorine, said apparatus comprising a fluid bed reactor containing a bed support consisting of a perforated plate or fritted disc beneath which is a compartamentalized gas plenium chamber, each compartment of the chamber being served by a gas feed line whereby sequential and alternating zones of carbon monoxide and chlorine are encountered by the ore proceeding through the fluidized bed, an overhead outlet tube by which gases are exhausted from the reactor, and a side outlet port by which the solid product is removed.

10 Claims, 5 Drawing Figures

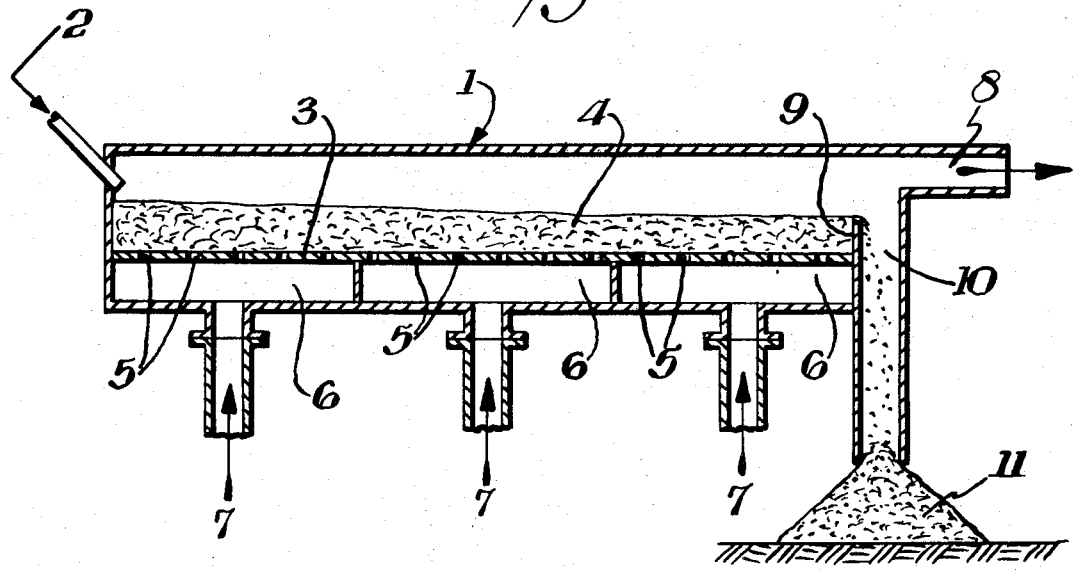
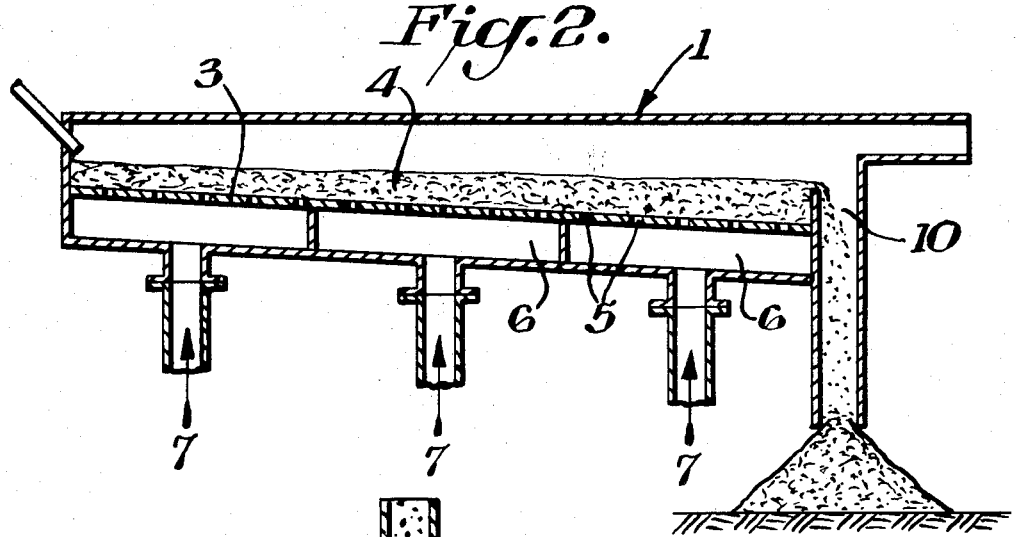
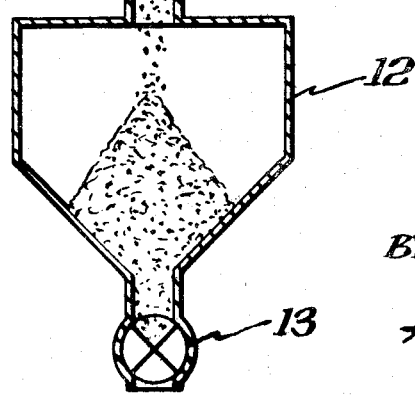

INVENTOR
BY Wendell E. Dunn, Jr.
ATTORNEY 3,713,781

CROSS-FLOW FLUID BED REACTOR

BACKGROUND OF THE INVENTION

1. Field of the Invention

This invention relates to a bed type cross-flow reactor.

2. The Prior Art

Solid-gas chemical reactions are customarily conducted in shaft furnaces, kilns, or mechanically stirred furnaces. Such reactors have disadvantages connected with the particle size-reaction velocity relationship as well as temperature-corrosive atmosphere relationships. Some of these problems have been solved by use of fluid-bed reactors.

However, where extensive removal of an impurity, or reaction to an extreme degree is required, it is ordinarily necessary to use a multi-stage fluid-bed reactor. In a fluid-bed process requiring multiple stages such as the beneficiation of ilmenite in which iron removal of greater than about 95 percent is desireable, the ilmenite is reacted step-wise in several stages in which the gas flow is counter-current to the solids flow. Such a reaction incurs extreme heat losses at high temperatures and gas distribution is complicated by the corrosive action of the reaction gases and entrained solids on many materials of construction.

I have discovered that the apparatus of this invention, which employs cross-current action between solids and gases, and sequential introduction of reactive gases, results in simplified gas distribution, improved gas-solid contact, improved separation of feed and product streams, and reduced corrosion even at high reaction temperatures.

SUMMARY OF THE INVENTION

In summary this invention is directed to a cross-current fluid bed reactor for the beneficiation of titaniferous ores at a temperature of 700° to 1250°C with carbon monoxide and chlorine comprising
 a. a reaction chamber having
  1. a solids inlet at one extremity; and
  2. a solids outlet and a gas outlet at the other extremity;
 b. a bed support positioned within the chamber to receive the solids comprising
  1. a support means; and
  2. a plurality of gas inlets in the support means; and
  3. a gas plenum chamber beneath the bed support comprising
   1. a plurality of separate compartments communicating with the bed support by means of the gas inlets in the supportive means; and
   2. each compartment being served by a gas feed line;
whereby sequential and alternating zones of carbon monoxide and chlorine gases can be passed through the bed in a direction across the current of flow of solids moving laterally along the bed, said solids being maintained in fluid state by said reactive gases.

This apparatus provides a fluid-bed reactor in which titaniferous ore can be reacted at 700° to 1250°C with carbon monoxide and chlorine in a sequential alternating manner to obtain essentially complete reaction of the iron oxide and other metal oxide impurities in the ore at reduced cost through improved gas-solid contact and reduction of corrosion.

BRIEF DESCRIPTION OF THE DRAWINGS

FIG. 1 is an axial cross-section of a reactor of this invention wherein ore can be reacted with reactant gases sequentially as described hereinafter.

FIG. 1A is an axial cross-section of a hopper-receiver which can be employed with the reactor of FIG. 1 in place of the solids collector.

FIG. 2 is an axial cross-section of another reactor of this invention wherein the solids flow in the bed is implemented by gravity.

DESCRIPTION OF THE INVENTION

Figure 3:
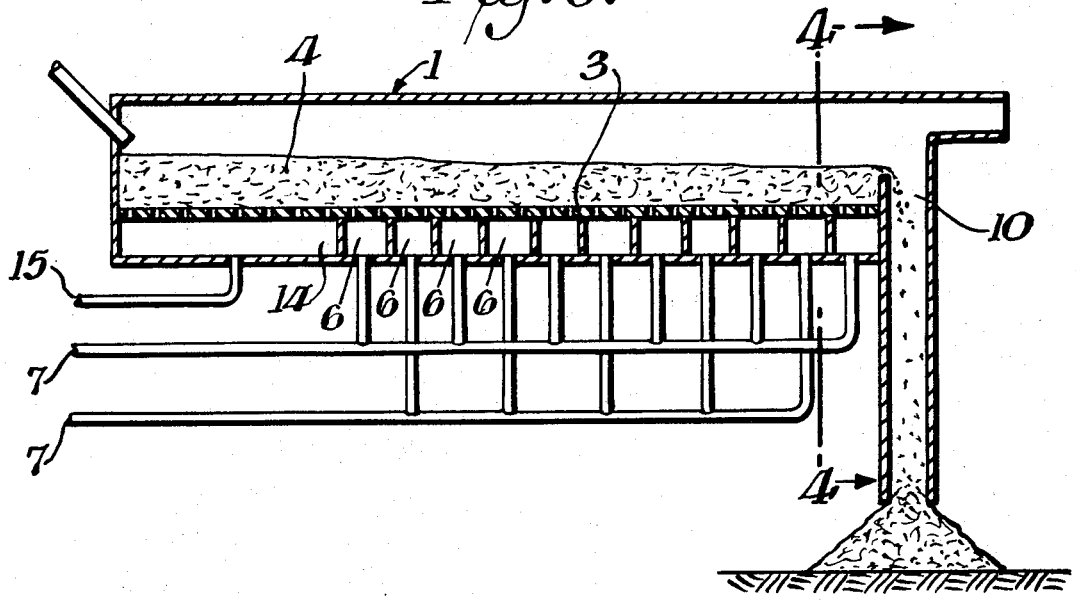
FIG. 3 is an axial cross-section of another reactor of this invention wherein the multiple chambers containing only one reactive gas are preceded by a chamber in which mixed reactive gases are fed.

This invention relates to a cross-current fluid-bed reactor for reacting titaniferous ores at 700° to 1250°C with carbon monoxide and chlorine in an alternating, sequential manner.

As stated above, the reactor of this invention comprises a reaction chamber, a bed support, and a compartmentalized gas-plenum chamber. In one end of the reaction chamber an inlet provides means for solids feed and two outlets at the other end of the reaction chamber provide means for separate gas and solids removal. The bed support bears the fluidized solids and contains a multiplicity of openings communicating with the gas plenum chamber whereby reactive and fluidizing gases are introduced into the reaction chamber.

Referring to FIG. 1, ore is introduced into the reactor 1 through inlet 2. The ore is supported on the support means 3 to form a bed 4. The support means can be for example a perforated plate of fitted disc. The support means contains a plurality of gas inlets 5, preferably 1/32 to 3/32 inch in diameter. The ore is agitated and fluidized by reactant gases introduced through gas inlets via the gas plenum chambers 6 and the gas feed lines 7. Gaseous products consisting primarily of iron chlorides, other metal chlorides, carbon monoxide and any diluent gases, are withdrawn from the reactor via the gas outlet tube 8. The solid product, consisting primarily of titanium dioxide is retained in the reactor to the desired depth by means of a weir or dam 9 which preferably is 0.5 to 2 feet in height and upon overflow is conveyed via the solids outlet 10 to a storage facility 11. Alternatively, a hopper 12 shown in FIG. 1A, can receive the beneficiated product where it is allowed to cool. The hopper can be emptied such as by means of a valve 13, and the product can be conveyed to a magnetic separator (not shown) to remove partially beneficiated ore containing greater than 1.0 percent by weight of $Fe_2O_3$.

FIG. 2 shows a reactor of this invention similar to that of FIG. 1, except the support means 3 is arranged such that the fluidized bed 4 has a depth gradient towards the solids outlet 10 of about 2 inches at the point of ore inlet to about 2 feet at the solids outlet for beneficiating ores by a uniform rate of flow of gases. This apparatus is useful.

FIG. 3 shows a reactor of this invention similar to that of FIG. 1, except the gas chambers 6 for each of the reactive gases is preceded by a single chamber 14 in which a mixture 15 of chlorine and carbon monoxide are fed to the fluid bed. Alternatively, the final chamber can be used to convey oxygen or air through the bed to burn off carbon which can be added to the ore mixture.

Figure 4:
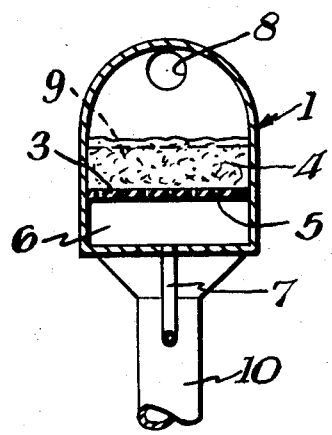
FIG. 4 is a sectional view across the reactor of FIG. 3 at line 2—2.

FIG. 4 shows a cross-sectional view of the reactor of FIG. 3; taken across the line 4—4.

Reactor operation

Titaniferous ore is fed to the reactor of this invention through a feed inlet and is supported on perforated supportive level. The ore bed is fluidized by streams of reactive gases, alternately carbon monoxide, then chlorine, then carbon monoxide, then chlorine, etc. for the length of the reactor. If desired, additional diluent gases such as oxygen, air, nitrogen or excess carbon monoxide can be used along with the reactive gases to keep the ore bed in a fluidized state and control the temperature. By this reaction sequence the iron content of the ore can be reduced to 0.2 percent by weight or less and essentially pure titanium oxide is produced. Generally speaking three carbonylation-chlorination cycles are desirable to achieve sufficient reduction of the iron content of the ore, and more than 20 are unnecessary. Preferably 4 to 12 cycles are preferred.

The feed rate of the reactive gases is balanced with that of diluent gases, if used, so as to maintain the ore bed in a fluidized state. Additionally, the feed rate of the reactive gases is controlled such that most of the gases are reactively consumed in the ore bed. Depending upon the depth of the ore bed, which is ordinarily between about 0.1 and 5 feet, the rate of flow of carbon monoxide and chlorine are usually between about 0.19 and 2.0 cubic feet per second. A preferred depth for the ore bed is about 0.1 to 1 foot and a preferred flow rate for the reactant gases is about 0.19 to 1.25 cubic feet per second.

The width and length of the reactor can vary widely. For example, the width can be up to 2 to 15 feet or wider. Preferably, the width is 5 to 10 feet. The length can also vary greatly depending upon the number of compartments used. For example the length can be 5 to 30 feet or longer and preferably is 10 to 20 feet.

The retention of ore in the reactor can be controlled by both feed rate, the width and length of the reactor and bed depth with the latter variable in accordance with weir or dam height. Bed depth control allows retention time variation of either the gases or solids by increasing or decreasing the bed depth at the product end. The bed depth need not be held constant, and by tilting the support means as in FIG. 2 either end may be made deeper with corresponding increased retention time in that section. By using a support means with other than a linear shape, the retention time in any section of the bed can be varied.

The introductory rate of gases described above ordinarily produces a flow rate of hot gases through the reactor of about 0.25 cubic feet per second, however lower or higher rates are operable.

It is preferable that the ore being used have an average particle size of at least 20 mesh and preferably 90 percent of the ore is 75 mesh. However ore of larger or smaller particle size can be used in the reactor of this invention.

The reactor is operated at a temperature ranging from about 700°C to as high as 1250°C or higher. It is preferred to keep the maximum temperature at about 1150°C and the most preferred temperature range is between 950° and 1050°C.

The product of this process is essentially pure, iron oxide-free, titanium dioxide. The titanium dioxide content of the product is ordinarily 95 percent, by weight, or higher and iron oxide content is ordinarily 1.0 percent, by weight, or less. The product may also contain small amounts of heavy metal oxides, generally less than 0.2 percent by weight, with the remainder being non-chlorinatable silicates and the like.

Materials of Construction

The reactor is fabricated of corrosion-resistant materials well known to the art such as quartz, a ceramic such as fire brick or the like, preferably, capable of withstanding contact with, singly or in mixtures, chlorine, titanium tetrachloride, ferrous and ferric chlorides, carbon monoxide and oxygen at temperature as high as 1250°C and higher. Other portions of the apparatus are similarly fabricated of materials known to the art to be suitable for the use to which they are put here. For example the gas plenium chamber is ordinarily divided with the same materials used in the reactor and the gas inlet pipes can be a ceramic material or a corrosion resistant metal. The product storage facility or hopper can be made of materials such as ceramic, concrete or metal.

As stated above, the apparatus of this invention is suitable for use in beneficiation of titaniferous ores. Titanium dioxide produced in the apparatus of this invention is less porous than titanium dioxide produced in prior art processes and contains a smaller amount of fines. As a result there is a decrease in the loss of titanium values in products prepared in the apparatus of this invention as compared with those of the prior art.

The following example further illustrates this invention.

The reactor of FIG. 1 having the weir set to form a bed depth of 1.0 foot, a length of 3 feet and a width of 9 feet was used to beneficiate a titaniferous ore obtained from Queensland, Australia and having, by weight, the following composition:

| | |
|---|---|
| TiO$_2$ | 54% |
| FeO | 21% |
| Fe$_2$O$_3$ | 21% |
| inert and other oxides | remainder |

The ore had a particle size distribution as follows:

| | | | |
|---|---|---|---|
| +60 | mesh | 0.04 | percent, by weight |
| −60+85 | " | 17.7 | " |
| −85+100 | " | 49.7 | " |
| −100+120 | " | 21.4 | " |
| −120 | " | 8.3 | " |

The reactor is heated to 1000°C. The rate of addition of the ore, carbon monoxide and chlorine to the reactor was adjusted to correspond to a flow rate through the hot ore bed of 0.25 cubic feet per second.

The product contained about 95 percent, by weight, TiO$_2$ and 1.0 percent, by weight, of iron oxide.

The reactor of FIG. 2 is another modification of my invention utilizing the concept that the rate of reaction of the beneficiation decreases as the iron content decreases. This device overcomes this problem by presenting to the reactant gases a greater amount of iron by increasing the bed depth.

The foregoing detailed description has been given for clarity of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A cross-current fluid-bed reactor for the beneficiation of titaniferous ores at a temperature of from 700° to 1250°C, comprising:
  a. a horizontally disposed reaction chamber having
    1. a solids inlet at one horizontal extremity; and
    2. a solids outlet means and a gas outlet at the other horizontal extremity;
  b. a bed support positioned within the chamber to receive the particulate titaniferous ore solids comprising:
    1. a support means; and
    2. a plurality of gas inlets in the support means;
  c. a source of a gaseous reducing agent;
  d. a source of a gaseous halogenating agent;
  e. a gas plenum chamber beneath the bed support comprising:
    1. a plurality of separate compartments communicating with the bed of titaniferous ore solids by means of the gas inlets in the support means; and
    2. each compartment being served by a separate gas feed line; and
  f. conduit means connecting some of said separate gas feed lines to said source of gaseous reducing agent and connecting the balance of said separate gas feed lines to said source of gaseous halogenating agent, said connections being such as to provide adjacent plenum compartments with gas from separate sources;

whereby sequential and alternating zones of reducing and halogenating gases can be passed through the bed in a direction across the current of flow of solids moving laterally along the bed, said solids being maintained in a fluidized state by said gases.

2. The apparatus of claim 1 wherein the gas inlets in the bed support are 1/32 to 3/32 inch in diameter.

3. The apparatus of claim 1 having a width of 2 to 15 feet, a length of 5 to 30 feet and means for retaining solids to a depth of 2 inches to 2 feet.

4. The apparatus of claim 1 wherein the gas plenum chamber contains from 3 to 20 compartments each communicating with the bed of solids.

5. The apparatus of claim 1 wherein the solid outlet means is a weir whereby the depth of the ore bed is controlled.

6. The apparatus of claim 1 wherein the gas plenum chamber contains from 3 to 20 compartments each for reducing agent and halogenating agent.

7. The apparatus of claim 6 wherein the gas plenum chamber contains for 4 to 12 compartments each for reducing agent and halogenating agent.

8. The apparatus of claim 1 wherein the bed support is tilted to give a deeper bed at the solids outlet.

9. The apparatus of claim 8 wherein the gas plenum chamber contains 3 to 20 compartments each communicating with the bed of solids.

10. The apparatus of claim 8 wherein the gas plenum chamber contains 4 to 12 compartments each communicating with the bed of solids.

* * * * *